US012204060B2

(12) United States Patent
Yu et al.

(10) Patent No.: US 12,204,060 B2
(45) Date of Patent: Jan. 21, 2025

(54) FULL-WAVEFIELD ANGLE GATHER FOR HIGH-CONTRAST INTER THIN-BED MODELS

(71) Applicant: CHINA PETROLEUM & CHEMICAL CORPORATION, Beijing (CN)

(72) Inventors: Jianhua Yu, Houston, TX (US); Yilong Qin, Katy, TX (US)

(73) Assignee: CHINA PETROLEUM & CHEMICAL CORPORATION, Beijing (CN)

( * ) Notice: Subject to any disclaimer, the term of this patent is extended or adjusted under 35 U.S.C. 154(b) by 124 days.

(21) Appl. No.: 18/064,414

(22) Filed: Dec. 12, 2022

(65) Prior Publication Data

US 2023/0184982 A1    Jun. 15, 2023

Related U.S. Application Data

(60) Provisional application No. 63/288,303, filed on Dec. 10, 2021.

(51) Int. Cl.
*G01V 1/50* (2006.01)
(52) U.S. Cl.
CPC ........ *G01V 1/50* (2013.01); *G01V 2210/6169* (2013.01)
(58) Field of Classification Search
CPC .......... G01V 1/50; G01V 2210/6169
See application file for complete search history.

(56) References Cited

U.S. PATENT DOCUMENTS

| 6,907,348 | B2 * | 6/2005 | Gaston | G01V 1/44 |
| | | | | 702/14 |
| 7,492,664 | B2 * | 2/2009 | Tang | G01V 1/28 |
| | | | | 181/102 |
| 10,884,148 | B2 * | 1/2021 | Calderón | G01V 1/282 |
| 2003/0010494 | A1 | 1/2003 | Bose et al. | |
| 2006/0104158 | A1 | 5/2006 | Walls et al. | |

(Continued)

OTHER PUBLICATIONS

Li et al. AVO Modeling in Seismic Processing andInterpretation II. Methodologies. Year: 2004.*

(Continued)

*Primary Examiner* — Mohamed Charioui
*Assistant Examiner* — Lynda Dinh
(74) *Attorney, Agent, or Firm* — NKL Law; Allen Xue

(57) ABSTRACT

Methods, apparatuses, and mediums related to a full-wavefield angle gather generation for high-contrast inter-thin bed modeling for reservoir characterizations of a survey region are provided. A method may include a well logging tool having one or more sonic generators and one or more well log data recording sensors in a wellbore. Sound waves may be generated using the one or more sonic generators in order to generate reflections in the survey region. Well log data, based on the reflections, may be received using well log data recording sensors, and the well log data may be transmitted to at least one memory. A method may perform, using a computer system, a full-wavefield angle gather generation. A method may generate, by a computer system, the high-contrast inter thin-bed models based on the full-wavefield angle gather.

18 Claims, 14 Drawing Sheets

(56) References Cited

U.S. PATENT DOCUMENTS

2015/0331134 A1* 11/2015 Haldorsen ............. E21B 47/005
                                                         367/35
2016/0097870 A1   4/2016 Routh et al.
2018/0231680 A1*  8/2018 Hirabayashi ........... G01V 1/366
2019/0293815 A1*  9/2019 Jocker ..................... G01V 1/50

OTHER PUBLICATIONS

Crotwell et al. The TauP Toolkit: Flexible Seismic Travel-Time and Raypath Utilities, Year: 2011.*

* cited by examiner

FULL-WAVEFIELD ANGLE GATHER FOR HIGH-CONTRAST INTER THIN-BED MODELS

TECHNICAL FIELD

The present disclosure relates to computer-implemented methods, apparatuses, and mediums for generating a full-wavefield angle gather to reduce amplitude distortion in amplitude versus offset/angle modeling in high-contrast inter thin-bed models for improved lithology identification and fluid discrimination in the field of seismic exploration and reservoir characterization.

BACKGROUND

Conventional linear amplitude versus offset (AVO) or amplitude versus angle (AVA) analysis/inversion are commonly used in the field of improved lithology identification and fluid discrimination in the field of seismic exploration and reservoir characterization. Conventional linear AVO/AVA analysis/inversion assumes that an input angle gather contains only primary reflected waves, which may be referred to as primary or primaries. However, the elimination of internal multiples and PSP (compressional to shear then back to compressional) converted waves while preserving primary reflections is a very challenging task, because the internal multiples and the PSP converted waves overlap with primaries in most cases. Multiples and PSP converted waves can impact the inverted results and bias the interpretation of the results. Therefore, assessing the effect of the multiples and PSP converted waves on (1) the AVO response and (2) the inversion result based on linear AVO theory is essential to ensure the AVO analysis/inversion is performed correctly in field data analysis. Accordingly, the calculation of a full-wavefield angle gather is required.

Conventional ray-based Zoeppritz theory methods only handle primary reflections. Ray tracing-based methods have difficulties in calculating higher-order multiples and converted waves. The offset-domain Kennett method is commonly used to simulate a full wavefield in an offset domain for AVO study. However, transforming data from offset domain to angle domain may generate amplitude distortion. Accordingly, there is a need to address challenges in the conventional AVO forward modeling approaches.

SUMMARY

One or more embodiments provide a full-wavefield angle gather for high-contrast inter thin-bed models using hybrid methods, apparatuses, and mediums for reservoir characterization of a survey region for seismic exploration.

In an aspect, there is provided method for generating full-wavefield angle gather in high-contrast inter thin-bed models for reservoir characterizations of a survey region. The method may include positioning a well logging tool having one or more sonic generators and one or more well log data recording sensors in a wellbore; generating sound waves, using the one or more sonic generators, to generate reflections in the survey region; receiving well log data based on the reflections using the one or more well log data recording sessors, transmitting the well log data to at least one memory, and storing the well log data in the at least one memory; generating, by a computer system, a full-wavefield angle gather; generating, by the computer system, the high-contrast inter thin-bed models based on the full-wavefield angle gather; and displaying one or more images of the high-contrast inter thin-bed models based on the full-wavefield angle gather.

In an aspect, generating the full-wavefield angle gather may further include calculating primary-only angle gather.

In an aspect, a Zoeppritz-based raytracing algorithm is used to calculate the primary-only angle gather.

In an aspect, generating the full-wavefield angle gather may further include generating a full-wavefield tau-p gather using Kennett modeling; generating tau-p gather without one or more multiples and/or without one or more PSP converted waves; and generating tau-p gather with only one or more multiples and/or one or more PSP converted waves by subtracting the tau-p gather without one or more multiples and/or without one or more PSP converted waves from the full-wavefield tau-p gather.

In an aspect, generating a full-wavefield angle gather may further include converting tau-p gather with only one or more multiples and/or one or more PSP converted waves into a migrated ray parameter gather by applying an elliptical moveout correction.

In an aspect, generating the full-wavefield angle gather may further include generating an angle gather with only one or more multiples and/or one or more PSP converted waves by converting the migrated ray parameter gather into the angle gather using slowness-to-angle mapping.

In an aspect, generating the full-wavefield angle gather may further include calculating primary-only angle gather using a Zoeppritz-based raytracing algorithm.

In an aspect, generating a full-wavefield angle gather may further include generating the full-wavefield angle gather by adding Zoeppritz-based raytracing-based primary-only angle gather with the angle gather with only one or more multiples and/or one or more PSP converted waves.

In an aspect, generating the full-wavefield gather may further include generating a full-wavefield tau-p gather using Kennett modeling; generating tau-p gather without one or more multiples; and generating tau-p gather with only one or more multiples by subtracting the tau-p gather without one or more multiples from the full-wavefield tau-p gather.

In an aspect, generating the full-wavefield gather may further include generating a full-wavefield tau-p gather using Kennett modeling; generating tau-p gather without one or more PSP converted waves; and generating tau-p gather with only one or more PSP converted waves by subtracting the tau-p gather without one or more PSP converted waves from the full-wavefield tau-p gather.

In an aspect, there is provided apparatus for generating a full-wavefield angle gather in high-contrast inter thin-bed models for reservoir characterizations of a survey region, the apparatus comprising. The apparatus may include a well logging tool configured to be positioned in a wellbore; the well logging tool includes one or more sonic generators to generate sound waves to generate reflections in the survey region; the well logging tool includes one or more well log data recording sensors configured to receive well log data based on the reflections, and configured to transmit the well log data; at least one memory storing the transmitted well log data, the at least one memory comprising instructions, and at least one processor to execute the instructions stored in the at least one memory to implement: generating a full-wavefield angle gather; generating the high-contrast inter thin-bed models based on the full-wavefield angle gather; and displaying one or more images of the high-contrast inter thin-bed models based on the full-wavefield angle gather.

BRIEF DESCRIPTION OF THE DRAWINGS

The teachings of the present invention can be readily understood by considering the following detailed description in conjunction with the accompanying drawings.

DETAILED DESCRIPTION

Figure 1:
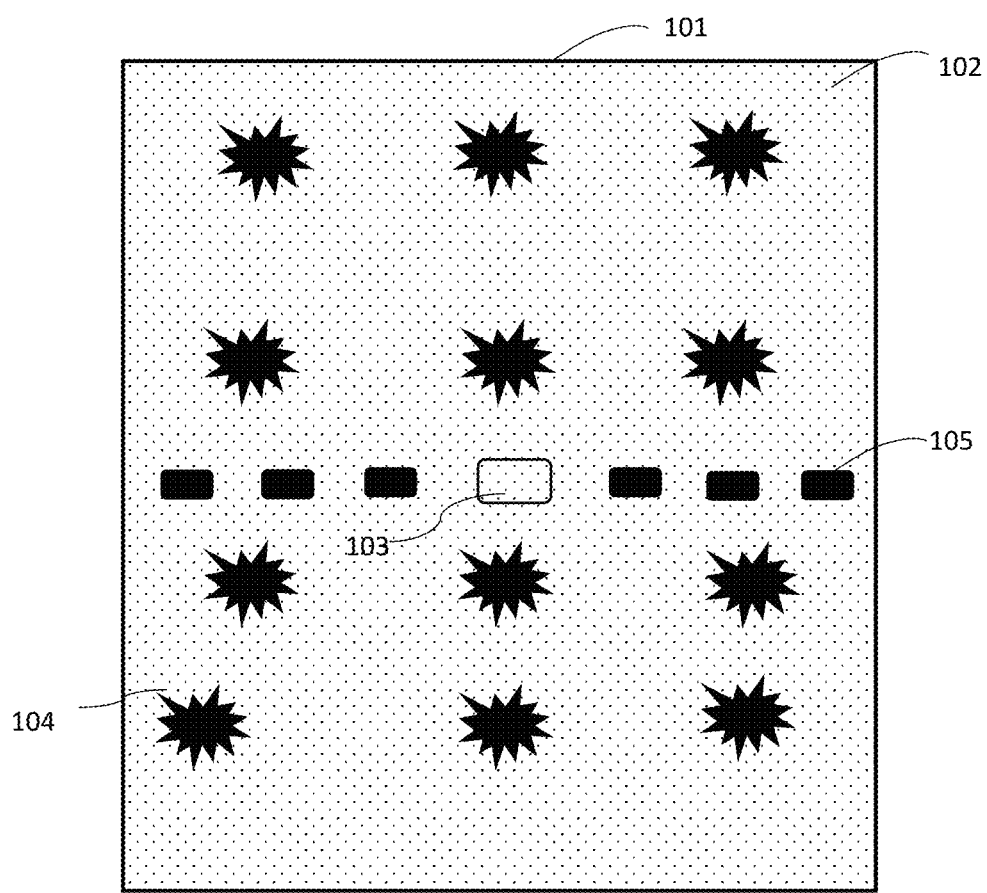
FIG. 1 is a schematic diagram illustrating a top view of a survey region with the various points of incidence of seismic sources according to an embodiment.

Reference will now be made in detail to embodiments of the present disclosure, examples of which are illustrated in the accompanying drawings. It is noted that wherever practicable, similar or like reference numbers may be used in the drawings and may indicate similar or like elements.

The drawings depict embodiments of the present disclosure for purposes of illustration only. One skilled in the art would readily recognize from the following description that alternative embodiments exist without departing from the general principles of the disclosure.

Throughout the specification, the terms method(s), approach(es), and technology are used interchangeably and have the same meaning.

Throughout the specification, the terms internal multiple(s) and multiple(s) are used interchangeably and have the same meaning.

Throughout the specification, the specification refers to the terms internal multiples, multiples, and PSP converted waves. Although the plural of these terms is used, it is understood that embodiments may include one or more multiples, one or more internal multiples, and/or one or more converted waves.

FIGS. 1-4 show exemplary embodiments of apparatuses, methods, and mediums which are used to capture seismic and well log data information.

FIG. 1 is a schematic diagram illustrating a top view of a survey region with the various points of incidence of seismic sources according to an embodiment. More specifically, FIG. 1 illustrates a seismic survey region 101, which is a land-based region. Reference numeral 102 denotes the top earth formation of the survey region 101. Persons of ordinary skill in the art will recognize that seismic survey regions produce detailed images of local geology to determine the location and size of possible hydrocarbon (oil and gas) reservoirs for establishing a wellsite 103. In these survey regions, seismic waves bounce off underground rock formations during emissions from one or more seismic sources at various points of incidence 104. A blast is an example of a seismic source generated by seismic equipment. The seismic waves that reflect back to the surface are captured by seismic data recording sensors 105, transmitted by one or more data transmission systems (frequently wirelessly) from the seismic data recording sensors 105, and stored for later processing and analysis by a high-performance computing system. Although this example shows the top earth formation 102 of the land-based survey region 101, it is understood that this is only an example and the methods and system may also be applied to a survey region at the surface or bottom of an ocean.

Figure 2:
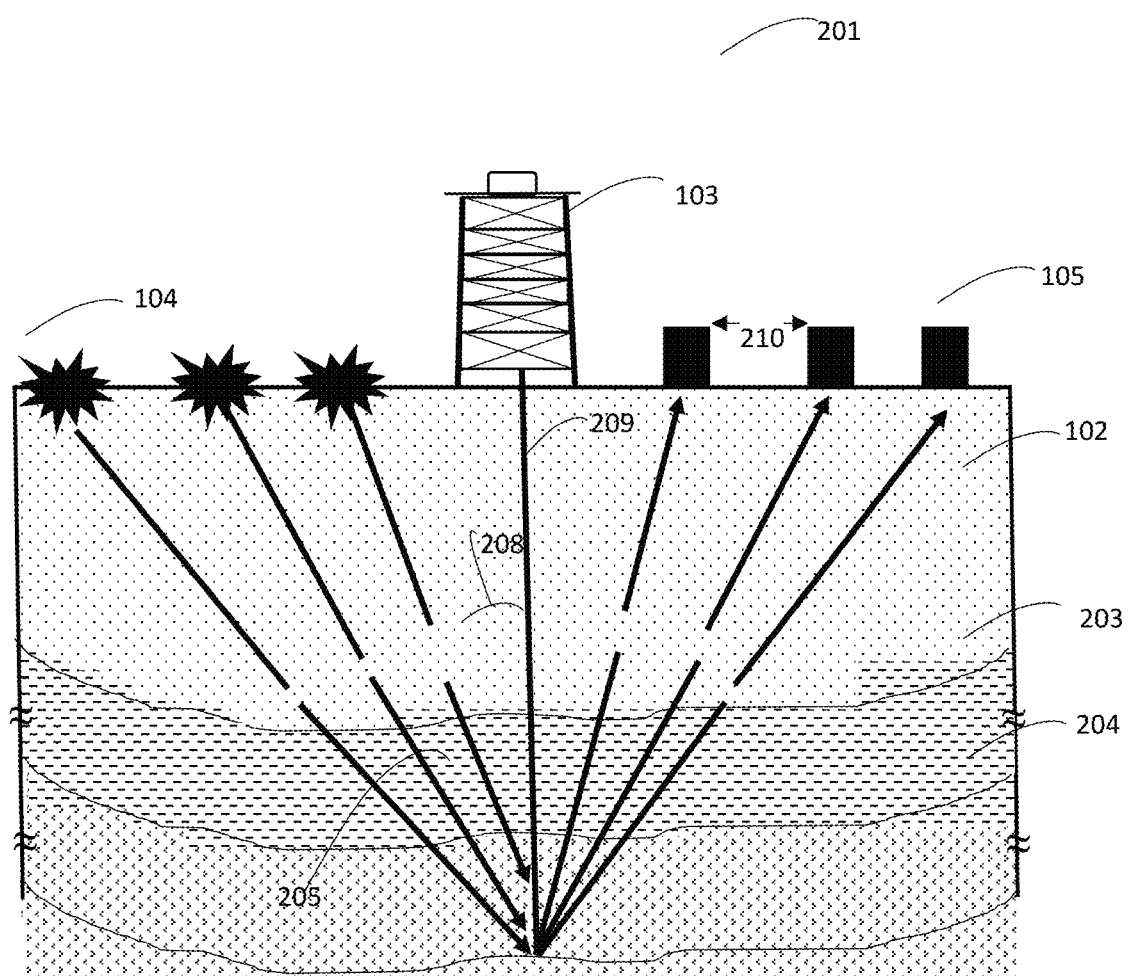
FIG. 2 is a schematic diagram illustrating a cross-sectional view of an environment with points of incidence of seismic sources, seismic receivers, a well location, a wellbore, various transmission rays, and various angles of incidence, according to an embodiment.

FIG. 2 is a schematic diagram illustrating a cross-sectional view of a seismic survey region 101 with points of incidence of seismic sources, seismic receivers, a well location, a wellbore, the various transmission rays, and the various angles of incidence, according to an embodiment. More specifically, in FIG. 2 a cross-sectional view of a portion of the earth over the seismic survey region is denoted by reference numeral 201, showing different types of earth formations denoted by reference numerals 102, 203, and 204. Although the seismic survey region is based on land in this example, it is understood that this is only an example and the methods and system may also be applied to a survey region at the surface or bottom of an ocean. FIG. 2 illustrates a common midpoint-style gather, where seismic data are sorted by surface geometry to approximate a single reflection point in the earth. In this example, data from one or more shots or blasts and receivers may be combined into a single image gather or used individually depending upon the type of analysis to be performed. Although FIG. 2 may illustrate a flat reflector and a respective image gather class, other types or classes of image gathers known in the art may be used, and its selection may depend upon the presence of various earth conditions or events. One or more shots or blasts represents seismic sources located at various points of incidence or stations denoted by reference numeral 104 at the surface of the earth where one or more seismic sources are activated.

As shown on FIG. 2, seismic energy or seismic sources from multiple points of incidence 104, will be reflected from the interface between the different earth formations. These reflections will be captured by multiple seismic data recording sensors 105, each of which will be placed at one of the different location offsets 210, and at the wellsite 103. Because all points of incidences 104, and all seismic data recording sensors 105 are placed at different offsets 210, the survey seismic data or traces, also known in the art as gathers, will be recorded at various angles of incidence represented by 208. The points of incidence 104 generate downward transmission rays 205, in the earth that are captured by their upward transmission reflection through the seismic data recording sensors 105. The wellsite 103, in this example, is illustrated with derrick attached to a wellbore 209, along which multiple measurements are obtained using techniques known in the art. This wellbore 209, is used to obtain well log data, which may include P-wave velocity, S-wave velocity, Density, among others. Other sensors, not depicted in FIG. 2, may be placed within the survey region to capture seismic data. Seismic data may be used to examine the dependence of amplitude, signal-to-noise, move-out, frequency content, phase, and other seismic attributes, on incidence angles, offset distances, azimuth, and other geometric attributes that are important for data processing and imaging of a seismic survey region.

Figure 3:
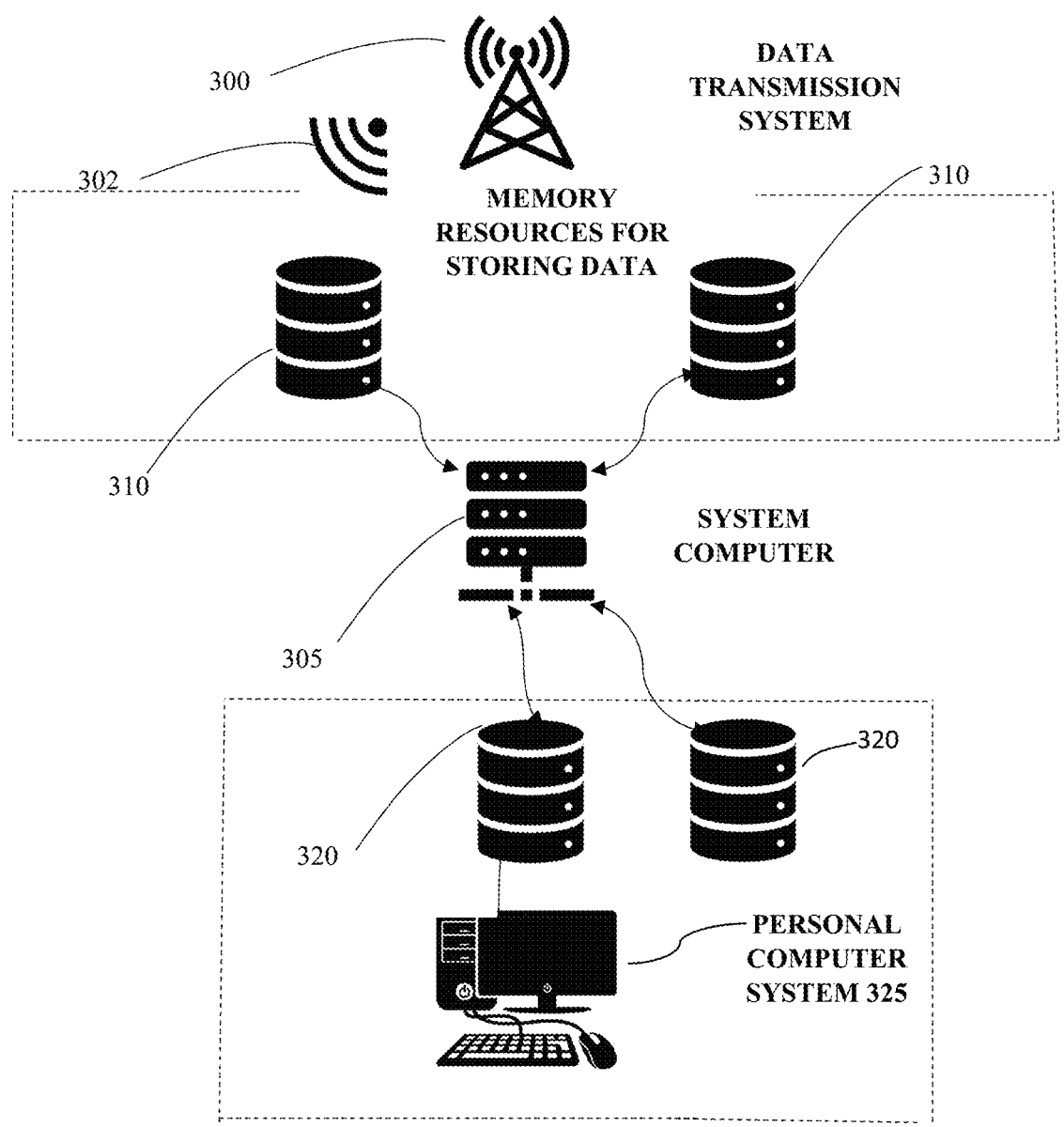
FIG. 3 is a schematic system diagram illustrating a high-performance computing system according to an embodiment.

FIG. 3 is a schematic diagram illustrating a high-performance computer system according to an embodiment, which receives (frequently wirelessly) seismic data regarding seismic waves from the seismic data recording sensors 105 and stores the seismic data in at least one memory for later processing and analysis by computer implemented methods and apparatuses of one or more embodiments. The analyzed or processed seismic data may be accessed by a personal computer system. More specifically, FIG. 3 shows a data transmission system 300 for wirelessly transmitting seismic data from seismic data recording sensors 105 to a system computer 305 coupled to one or more storage devices 310 to store the seismic data in databases. The data transmission system may also transmit wirelessly seismic data from seismic data recording sensors 105 directly to one or more storage devices 310 to store the seismic data in databases, which may be accessed by system computer 305. The wireless transmission is denoted by reference numeral 302. The one or more storage devices 310 may also store other computer software instructions or programs to implement apparatuses and methods described in embodiments. The system computer 305 may be coupled (e.g., wirelessly coupled) to one or more output storage devices 320, which may receive the results of computer implemented processes or methods performed by the system computer 305. A personal computer system 325 may be coupled (e.g., wirelessly coupled) to one or more output storage devices 320 and/or to the system computer 305 so that a user may utilize a user interface of the personal computer system 325 to input information or obtain the results of the computer implemented processor methods performed by the system computer 305. The one or more storage devices 320 may also store other computer software instructions or programs to implement apparatuses and methods described in embodiments.

A user interface of the personal computer system 325 may include, for example, one or more of a keyboard, a mouse, a joystick, a button, a switch, an electronic pen or stylus, a gesture recognition sensor (e.g., to recognize gestures of a user including movements of a body part), an input sound device or voice recognition sensor (e.g., a microphone to receive a voice command), an output sound device (e.g., a speaker), a track ball, a remote controller, a portable (e.g., a cellular or smart) phone, a tablet PC, a pedal or footswitch, a virtual-reality device, and so on. The user interface may further include a haptic device to provide haptic feedback to a user. The user interface may also include a touchscreen, for example. In addition, a personal computer system 325 may be a desktop, a laptop, a tablet, a mobile phone or any other personal computing system.

Processes, functions, methods, and/or computer software instructions or programs in apparatuses and methods described in embodiments herein may be recorded, stored, or fixed in one or more non-transitory computer-readable media (computer readable storage (recording) media) that includes program instructions (computer readable instructions) to be implemented by a computer to cause one or more processors to execute (perform or implement) the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more non-transitory computer-readable media, in order to perform the operations and methods described above, or vice versa. In addition, a non-transitory computer-readable medium may be distributed among computer systems connected through a network and program instructions may be stored and executed in a decentralized manner. In addition, the computer-readable media may also be embodied in at least one application specific integrated circuit (ASIC) or Field Programmable Gate Array (FPGA).

The one or more databases may include a collection of data and supporting data structures which may be stored, for example, in the one or more storage devices 310 and 320. For example, the one or more storage devices 310 and 320 may be embodied in one or more non-transitory computer readable storage media, such as a nonvolatile memory device, such as a Read Only Memory (ROM), Programmable Read Only Memory (PROM), Erasable Programmable Read Only Memory (EPROM), and flash memory, a USB drive, a volatile memory device such as a Random Access Memory (RAM), a hard disk, floppy disks, a blue-ray disk, or optical media such as CD ROM discs and DVDs, or combinations thereof. However, examples of the storage devices 310 and 320 are not limited to the above description, and the storage may be realized by other various devices and structures as would be understood by those skilled in the art.

Figure 4:
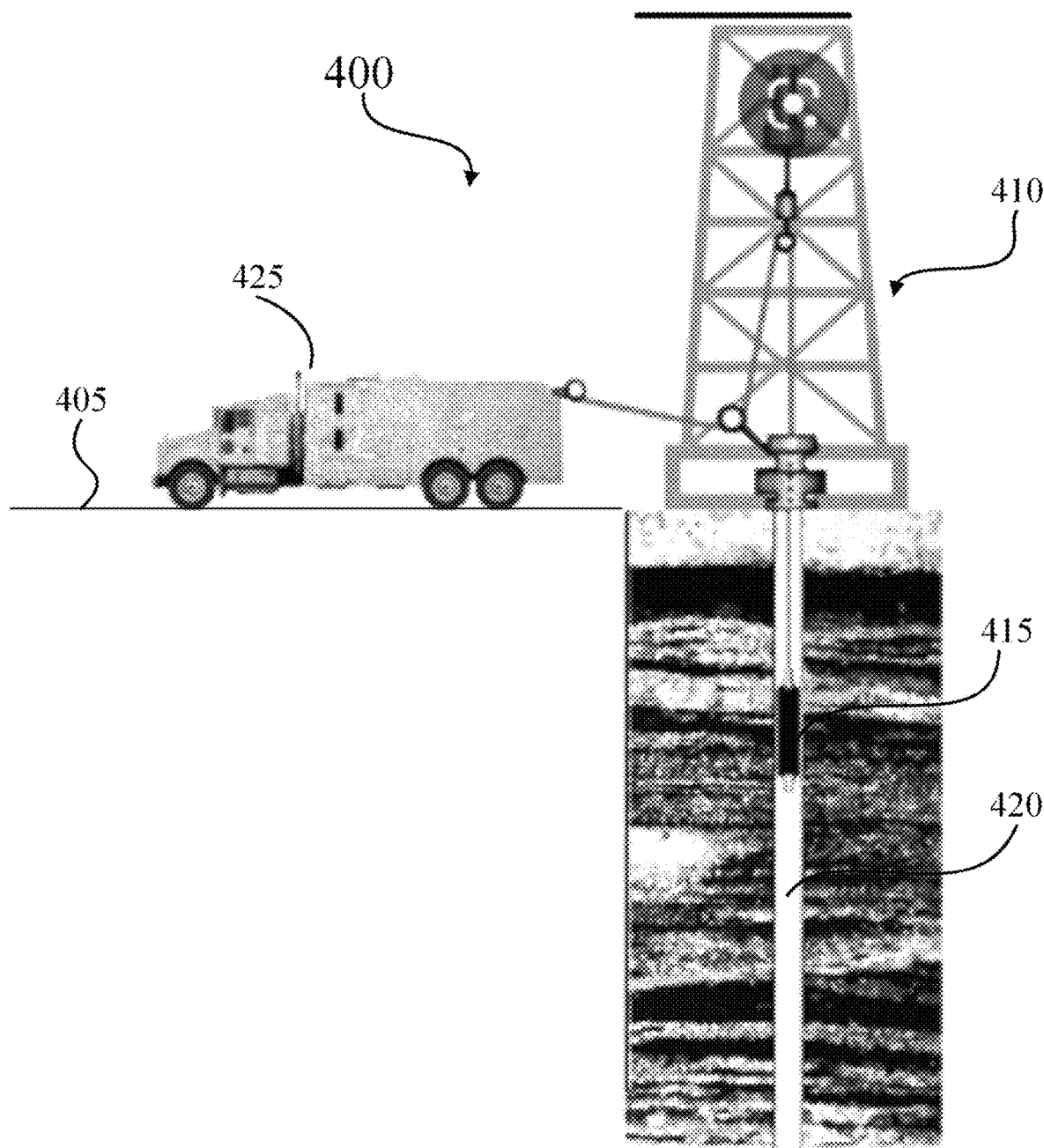
FIG. 4 is a schematic diagram illustrating a cross-sectional view of an environment with a wellbore and well logging tool including at least one sonic generator and at least one well log data recording sensor according to an embodiment.

FIG. 4 is a schematic diagram illustrating a cross-sectional view of an environment with a wellbore and well logging tool having at least one sonic generator and at least one well log data recording sensor according to an embodiment. FIG. 4 shows an oil drilling system 400 on land 405 including a drilling rig 410. The drilling rig 410 supports the lowering of a well logging tool 415 into a wellbore 420. The well logging tool 415 includes one or more sonic generators (sonic sources) to generate one or more sound waves, which are transmitted into one or more earth formations to generate reflections or reflection waves in the one or more earth formations. Although this example shows one or more earth formations of a land-based survey region, it is understood that this is only an example and that the methods and systems may also be applied to a survey region at the surface or bottom of an ocean. The well logging tool 415 also includes one or more well log data recording sensors. The one or more well log data recording sensors receive and record well log data, which includes reflection data received by the one or more well log data recording sensors in response to the sound waves transmitted into one or more earth formations by the one or more sonic generators. The well log data may include compression wave velocity ($V_p$), shear wave velocity ($V_s$), and density, which is an indicator of porosity. This well logging process to record well log data may also be referred to as sonic logging. A vehicle 425 may be coupled to the well logging tool 415 to assist in the lowering and raising of the well logging tool 415 as well as communicating with the well logging tool 415 to obtain well log data, which can then be transmitted wirelessly and/or over a wire to one or more storage devices such as storage devices 310 in FIG. 3 for further processing by the high-performance computer system shown in FIG. 3.

Figure 5:
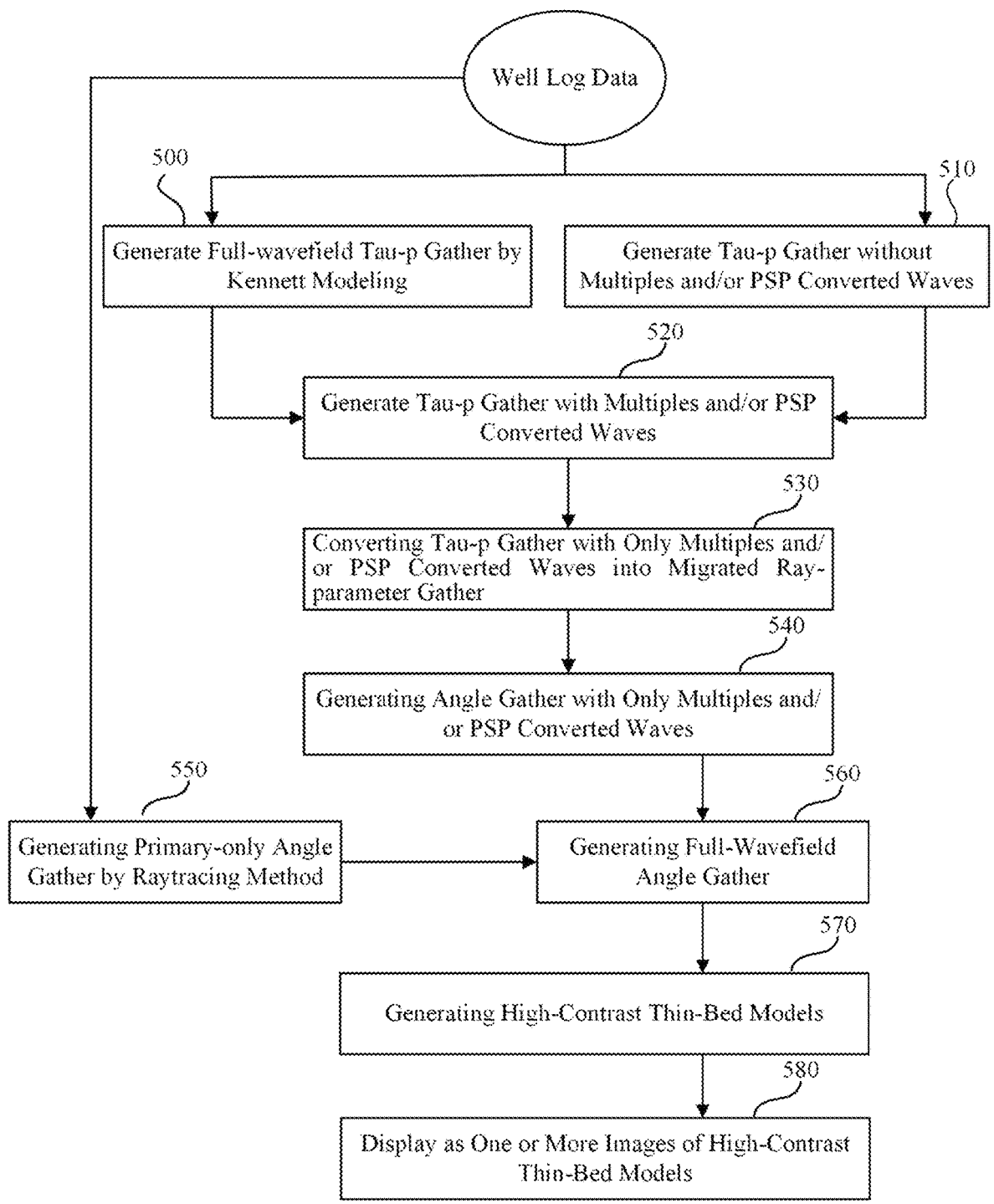
FIG. 5 is a flow chart illustrating generation of full-wavefield angle gather using a hybrid method to generate high-contrast inter thin bed models according to an embodiment.
Figure 6:
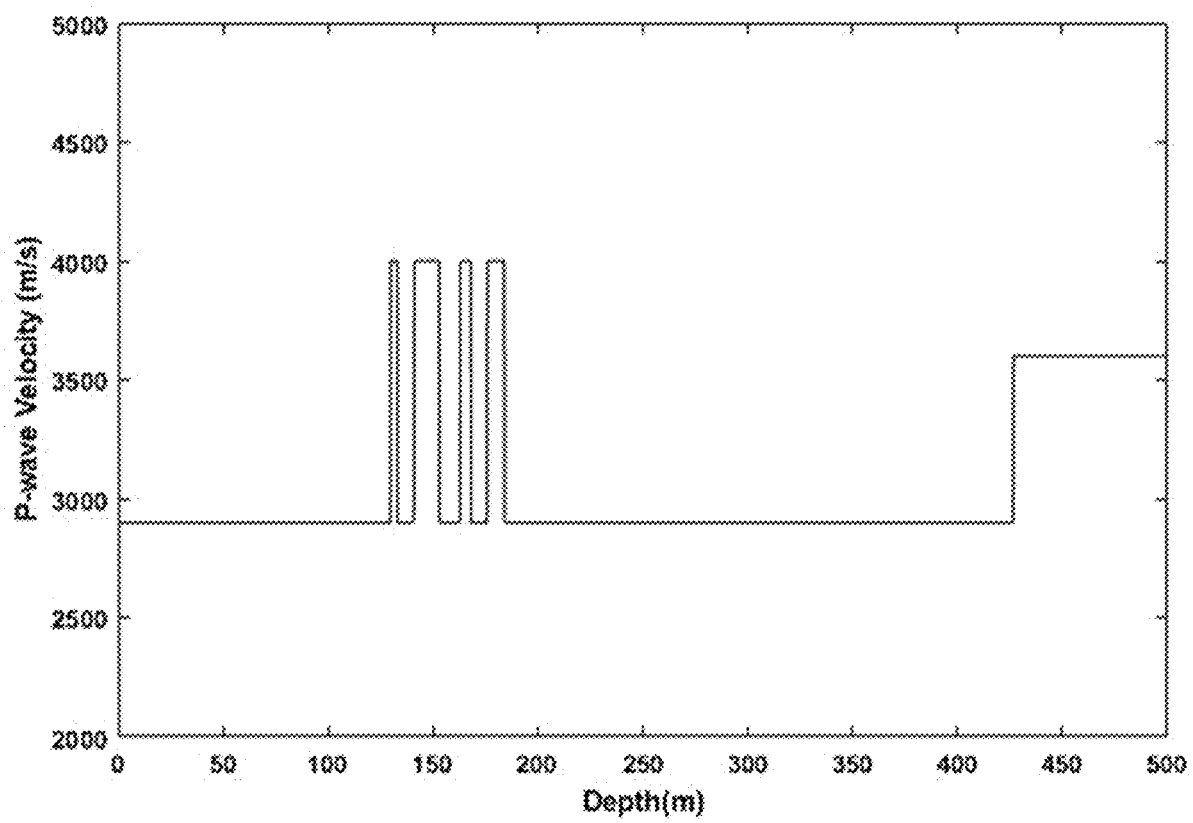
FIG. 6 shows a graph illustrating a compression wave velocity model (P-wave velocity model) with strong inter thin beds which are used to generate the full-wavefield angle gather according to an embodiment.

FIG. 5 is a flowchart illustrating a generation of a full-wavefield angle gather using a hybrid method to generate high-contrast inter thin bed models according to an embodiment. In a preferred embodiment, the well log data may be input into operations 500, 510, and 550 in FIG. 5 in the form of one or more subsurface seismic models for compression wave velocity (Vp), shear wave velocity (Vs), and/or density. This well log data is used to generate (produce) high resolution subsurface elastic models for compression wave velocity (Vp), shear wave velocity (Vs), and/or density, which may be referred to as seismic models. An example of this seismic model is shown in FIG. 6.

Although well log data in the form of a model is the preferred data used in generating the full-wavefield angle gather to reduce amplitude distortion in amplitude versus offset/angle modeling in high-contrast inter thin-bed models for reservoir characterizations of a survey region as shown in FIG. 5, density may be estimated from the measured compression wave velocity (Vp) and shear wave velocity (Vs) or measured using special logging tool such as a sonic logging tool or neutron porosity logging tool.

With respect to FIG. 5 illustrating a generation of a full-wavefield angle gather using a hybrid method to generate high-contrast inter thin bed models, one or more embodiments take advantage of a Zoeppritz approach and a tau-p domain Kennett approach to implement a more accurate full-wavefield angle gather simulation using a hybrid approach for AVO analysis/inversion. The primary reflected waves may be directly calculated by using Zoeppritz-based raytracing algorithm. Thus, the steps of normal moveout (NMO) correction, geometric spreading correction and offset-to-angle conversion are not needed, and the primary reflected waves are free of any artifact for a high-contrast inter thin bed model. The angle gather of multiples and/or PSP converted waves is obtained indirectly via tau-p domain Kennett modeling. In order to separate out the multiples and PSP converted waves, the Kennett modeling approach is modified to calculate the tau-p gather without multiples and/or PSP converted waves associated with any of reflectors. Accordingly, as shown in FIG. 5, well log data stored in one or more storage devices (e.g., storage devices 310 and 320) is used to generate a full-wavefield tau-p gather by Kennett modeling in operation 500 and is used to generate a tau-p gather without multiples and/or PSP converted waves in operation 510. The well log data may be input into operations 500 and 510 in the form of one or more subsurface seismic models for compression wave velocity (Vp), shear wave velocity (Vs), and/or density. Thus, a full-wavefield tau-p gather and tau-p gather without multiples and/or PSP converted waves is obtained in operations 500 and 510.

Referring to operation 520, the tau-p gather with only multiples and/or PSP converted waves is generated by subtracting the tau-p gather without multiples and/or PSP converted waves (which was generated in operation 510) from the full-wavefield tau-p gather (which was generated by Kennett modeling in operation 500). The tau-p gather with only multiples and/or PSP converted waves is converted into a migrated ray-parameter gather with only multiples and/or PSP converted waves by applying elliptical moveout correction in operation 530. Then, the ray-parameter gather is converted into an angle gather with only multiples and/or PSP converted waves by using slowness-to-angle mapping in operation 540. A raytracing-based primary only-gather is generated in operation 550 preferably by a Zoeppritz-based raytracing algorithm using the well log data stored in one or more storage devices (e.g., storage devices 310 and 320). The well log data may be in the form of one or more subsurface seismic models. A full-wavefield angle gather is generated by adding raytracing-based primary-only angle gather from operation 550 to the angle gather with only multiples and/or PSP converted waves from operation 540 in operation 560, which is used to in the amplitude versus offset/angle analysis/inversion to generate high-contrast thin-bed models in operation 570. One or more images of the high-contrast inter thin-bed models based on the full-wavefield angle gather may be displayed on a display of a computer device such as the personal computer system 325 shown in FIG. 3.

In a Kennett modeling approach, the roles of reflectivity and travel time are decoupled. The reflectivity coefficient of upward reflection, downward reflection, P-S and S-P converted waves are calculated explicitly for each of the reflectors. Thus, in Kennett modeling, any reflection coefficient can be modified while keeping the other coefficients as well as the travel time calculation unaltered. Thus, any of the wave modes associated with any of the reflectors can be removed. To obtain the primary-only tau-p gather, different reflectivity coefficients are modified by setting all the reflectivity coefficients to zero, except for the downward P-wave transmission, upward P-wave transmission, and upward P-wave reflection coefficient. To remove the multiples for a given range of reflectors, a downward reflection coefficient is set to be zero for those reflectors. Then, by using subtraction between full-wavefield tau-p gather, primary-only tau-p gather and tau-p gather without multiples, the multiples and PSP converted waves can be separated. For example, the internal-multiple only tau-p gather can be obtained by subtracting the tau-p gather without multiples from the full-wavefield tau-p gather. The PSP converted-wave only gather can be obtained by subtracting the primary-only gather, multiple-only gather from the full-wavefield gather. The tau-p gather with only multiples and/or PSP converted waves are converted into a migrated ray-parameter gather with only multiples and/or PSP in operation 530 are then converted into angle domain in operation 540 and added into the primary-only angle gather obtained by ray tracing method to in operation 550 to finally obtain the full-wavefield angle gather in operation 560, which is used to generate high-contrast thin-bed models in operation 570. The generated high-contrast thin-bed models are then displayed in operation 580 on a display such as the display of the personal computer system 325 shown in FIG. 3.

One or more embodiments may obtain the full-wavefield angle gather with primary and multiples associated with a given reflector, or the angle gather with only primary and converted waves associated with specific range of reflectors. Thus, the strength of multiples and PSP converted waves for any given reflector can be examined and their effect on the analysis/inversion result can be evaluated separately.

FIGS. 6-11 illustrate a method by using a model with strong inter thin beds to generate full-wavefield angle gather and comparing results with that from a conventional method. FIG. 6 shows a graph illustrating a compressional wave velocity model (P-wave velocity model) with strong contrast inter thin beds which are used to generate the full-wavefield angle gather according to an embodiment. The compressional wave velocity model based on measured compression wave velocities (Vp) is an example of a seismic model. As discussed above, a shear wave velocity model (S-wave velocity model) based on measured shear wave velocities (Vs) is also an example of a seismic model, and a density model based on measured density is another example of a seismic model. Although FIG. 6 illustrates a P-wave velocity model, it is understood that an S-wave velocity model and density model need be input into operations 500, 510, and 550 in FIG. 5 to generate the full-wavefield angle gather according to an embodiment.

Figure 7A:
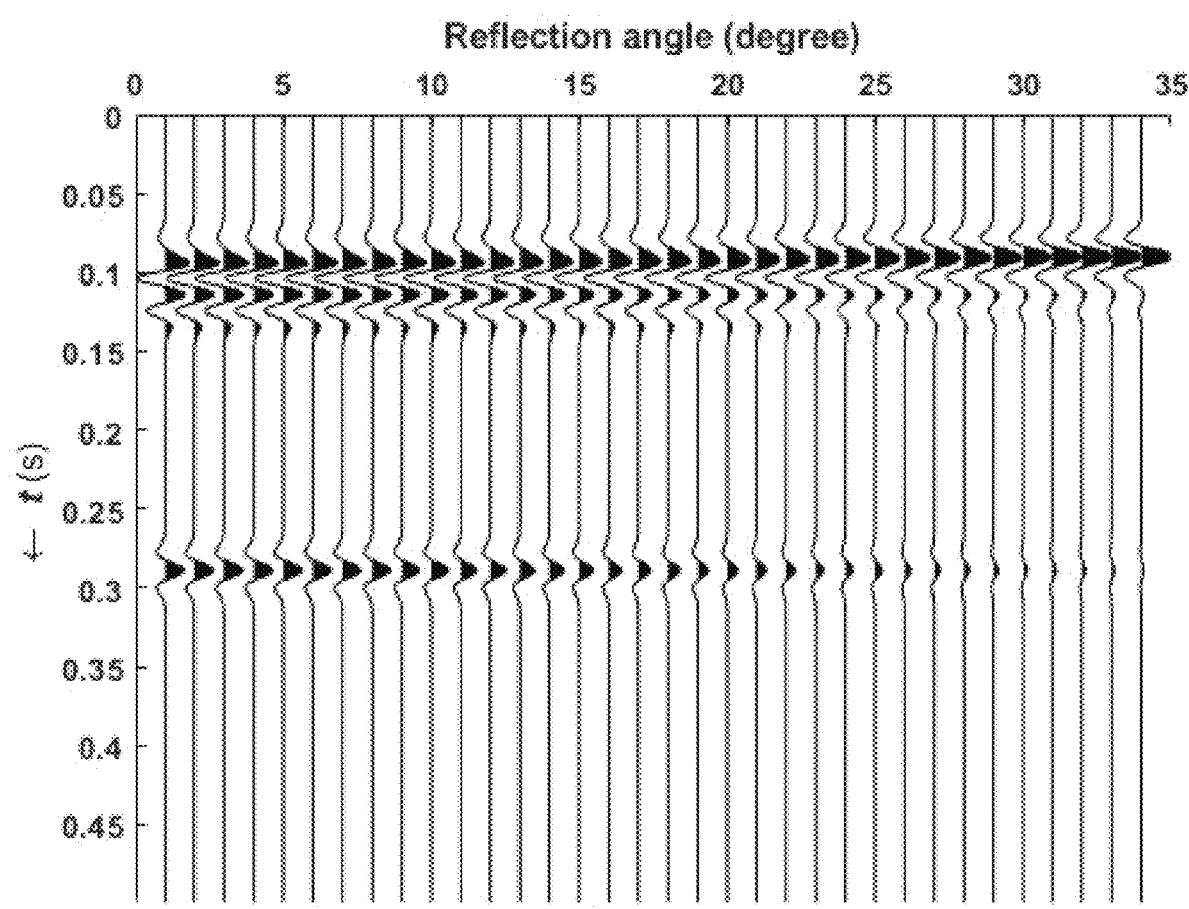
FIG. 7A is a graph illustrating a primary-only gather by a ray tracing method according to an embodiment.
Figure 7B:
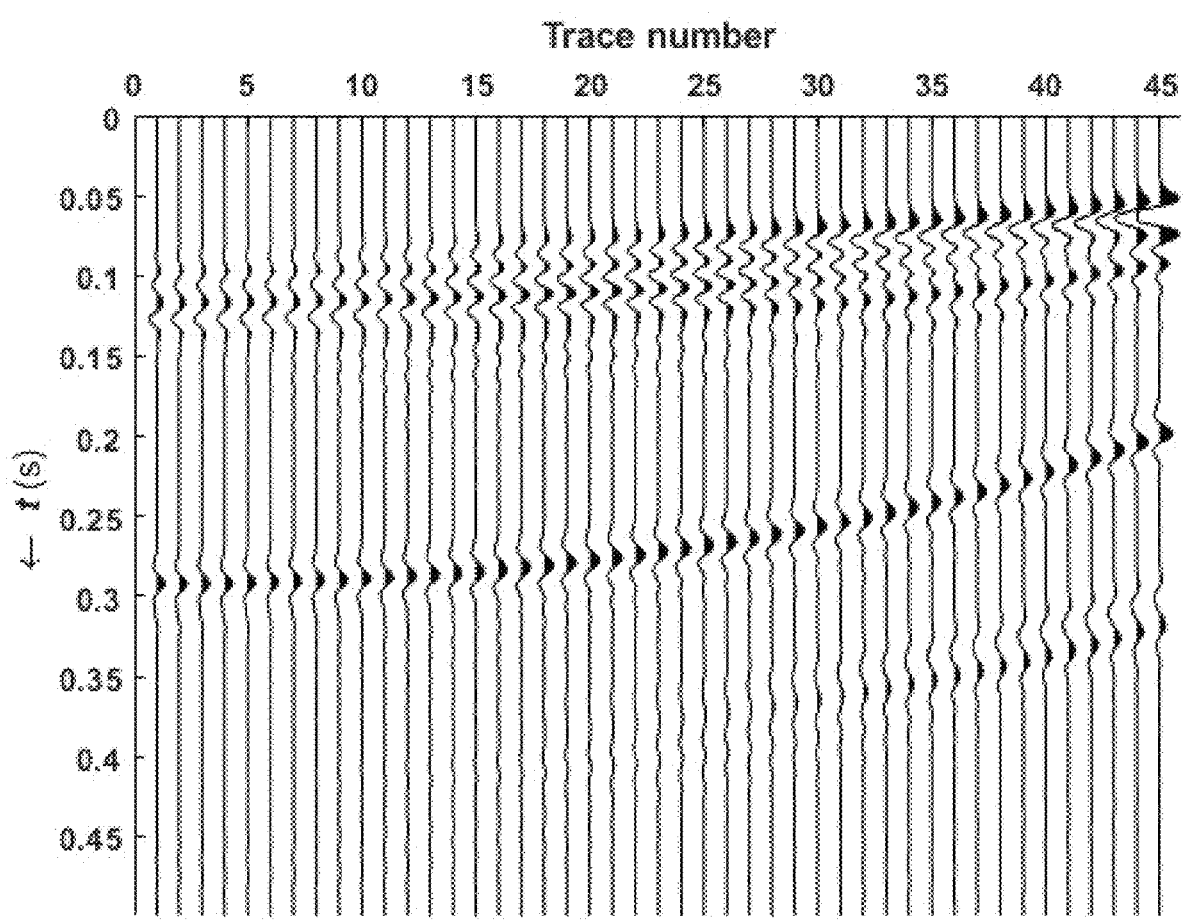
FIG. 7B is a graph illustrating a Tau-p gather with only multiple and converted waves according to an embodiment.
Figure 7C:
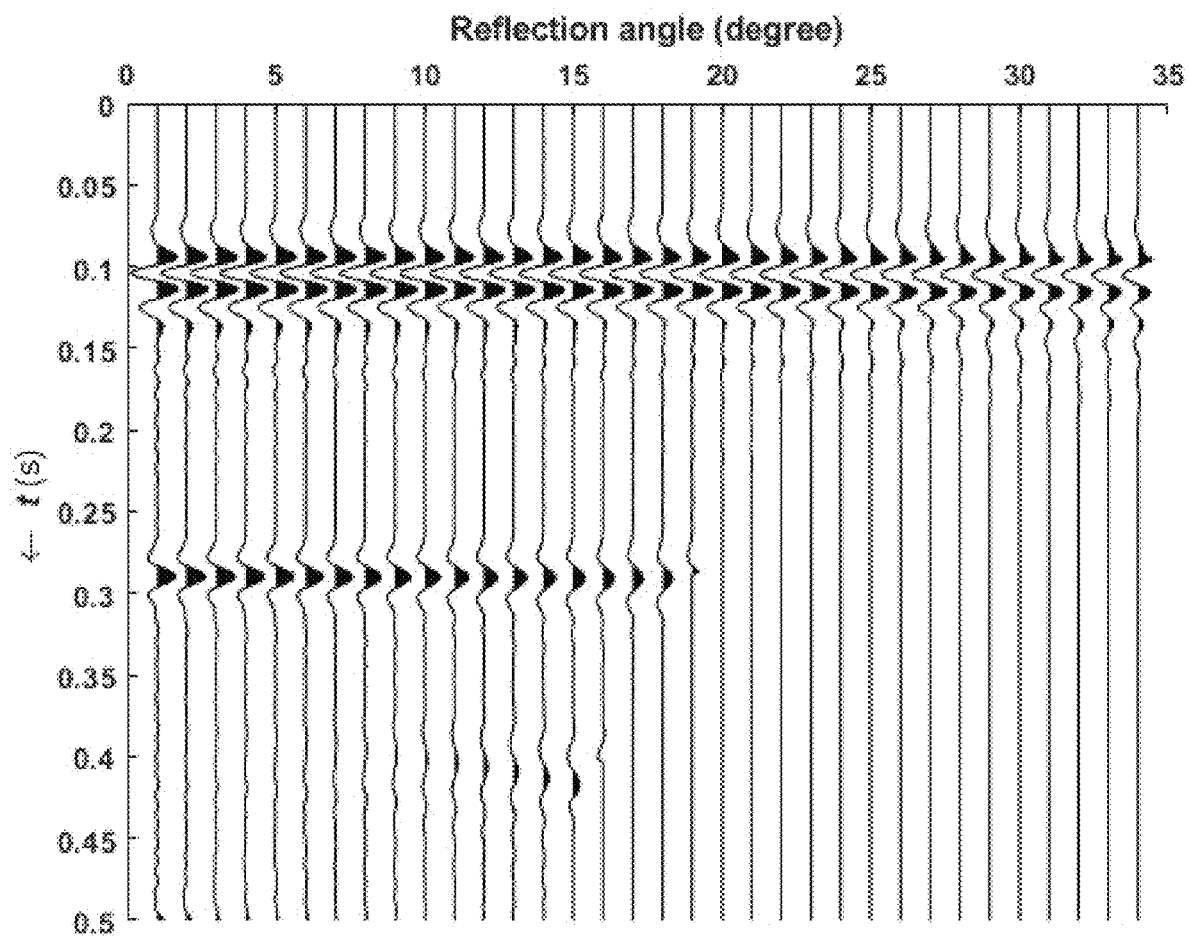
FIG. 7C is a graph illustrating a full-wavefield angle gather by a conventional Kennett method.
Figure 7D:
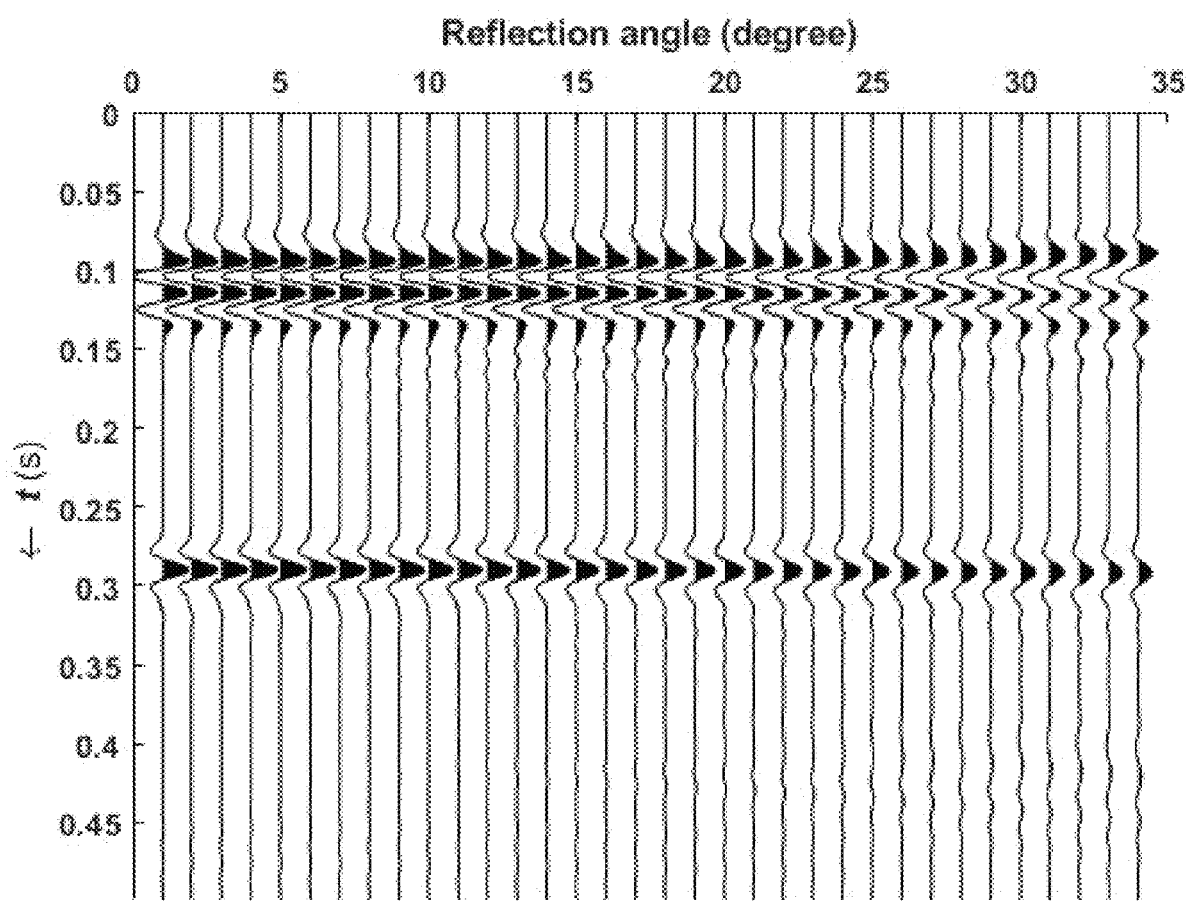
FIG. 7D is a graph illustrating a full-wavefield angle gather according to an embodiment.

FIG. 7A is a graph illustrating a primary-only gather by a ray tracing method in operation 550 according to an exemplary embodiment. FIG. 7B is a graph illustrating a Tau-p gather with only multiple and converted waves in an operation 520 according to an exemplary embodiment. FIG. 7C is a graph illustrating a full-wavefield angle gather by a conventional Kennett method. FIG. 7D is a graph illustrating a full-wavefield angle gather in operation 560 according to an embodiment.

Figure 8:
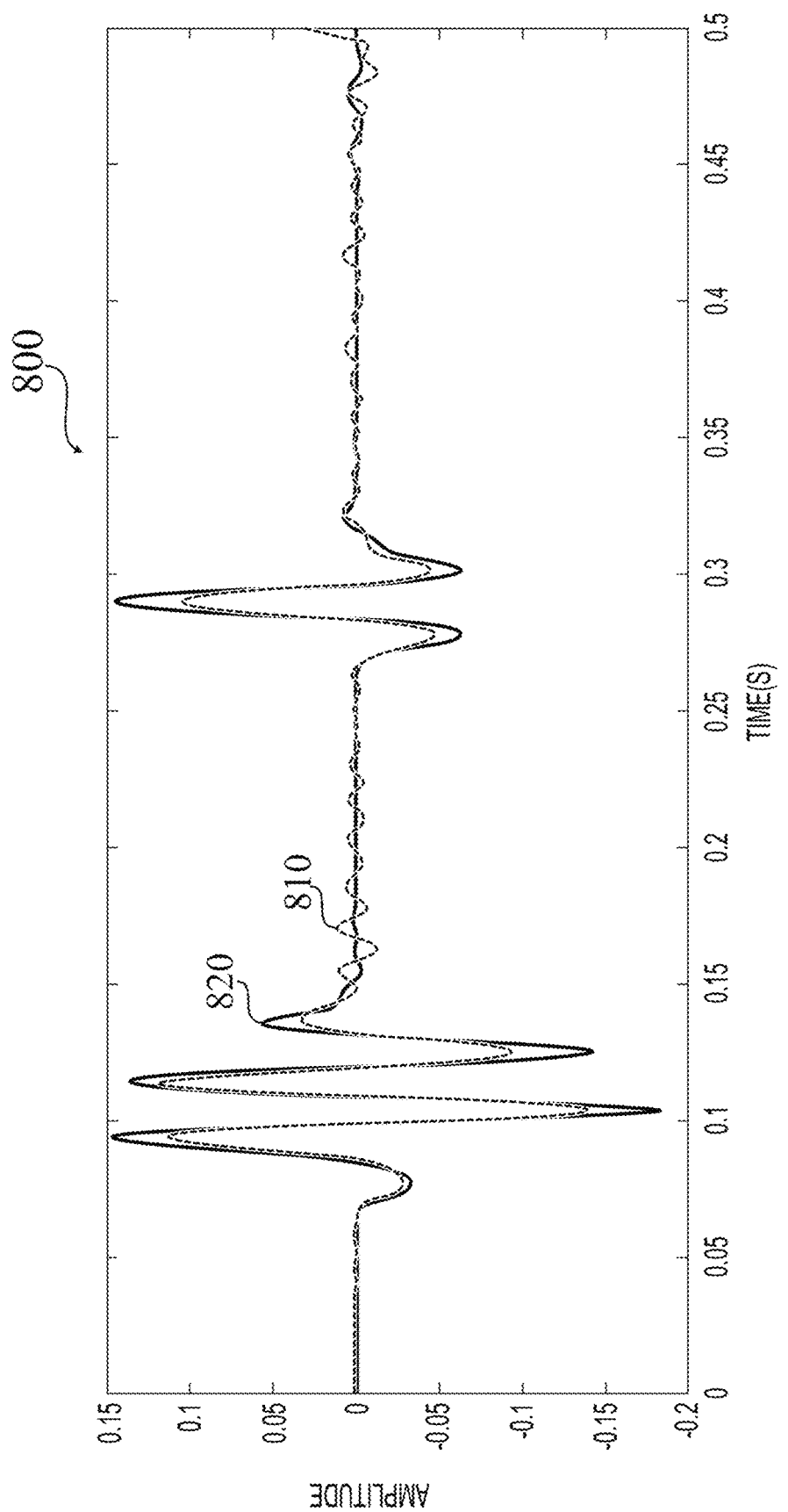
FIG. 8 is a graph illustrating a comparison of a zero-angle trace between the conventional full-wavefield angle gather in FIG. 7C and the full-wavefield angle gather according to an embodiment in FIG. 7D.

FIG. 8 is a graph 800 illustrating a comparison of a zero-angle trace between the conventional full-wavefield angle gather in FIG. 7C and the full-wavefield angle gather according to an embodiment in FIG. 7D. FIG. 8 shows a zero-angle trace and denoted by reference numeral 810 corresponding to the conventional method, and shows a zero-angle race and denoted by reference numeral 820 corresponding to an embodiment of the present invention. As shown in FIG. 8, the zero-angle trace corresponding to the conventional method is noisy due to artificial oscillations (artifacts). In comparison, the zero-angle trace corresponding to an embodiment of the present invention provides a smooth curve. This smooth cure has fewer artifacts. This smooth cure has fewer oscillations in number and magnitude. Accordingly, the smooth cure of the zero-angle trace corresponding to an embodiment of the present invention is much clearer than the zero-angle trace corresponding to the conventional method, which is distorted due to the artifacts (noise).

Figure 9:
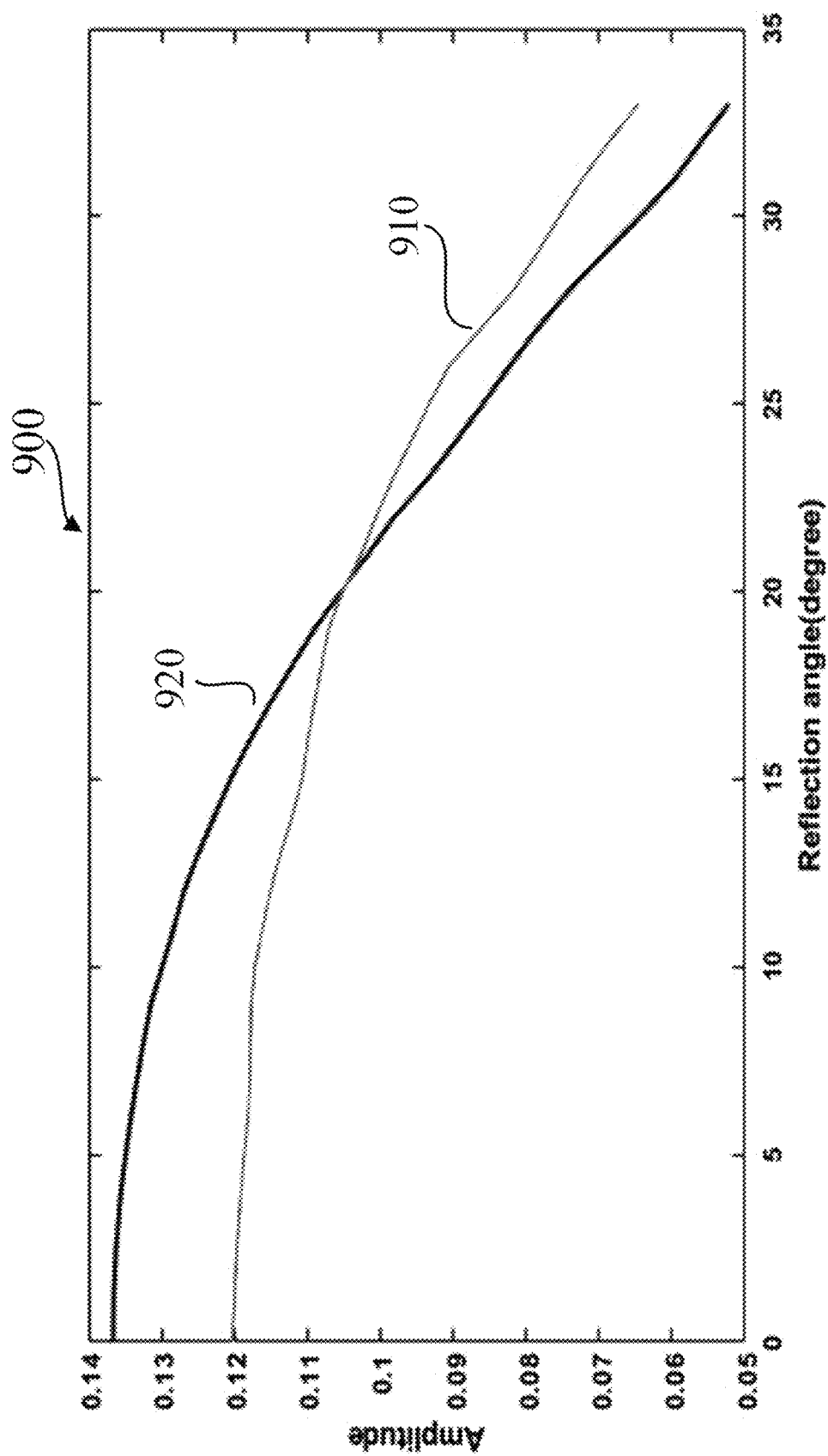
FIG. 9 is a graph illustrating a comparison of a picked AVA curve for reflection around 0.115 seconds between the conventional full-wavefield angle gather in FIG. 7C and the full-wavefield angle gather according to an embodiment in FIG. 7D.

FIG. 9 is a graph 900 illustrating a comparison of an extracted AVA curve for reflections around 0.115 seconds between the conventional full-wavefield angle gather in FIG. 7C and the full-wavefield angle gather according to an embodiment in FIG. 7D. The extracted AVA curve of the conventional full-wavefield angle gather is denoted by reference numeral 910. The extracted AVA curve from the full-wavefield angle gather according to an embodiment is denoted by reference numeral 920. The extracted AVA curve corresponding to an embodiment of the present invention is much clearer than the extracted AVA curve of the conventional method, which is distorted due to the artifacts (noise). The extracted AVA curve for the full-wavefield angle gather according to an embodiment is smoother than the selected AVA curve for the conventional full-wavefield angle gather.

Figure 10:
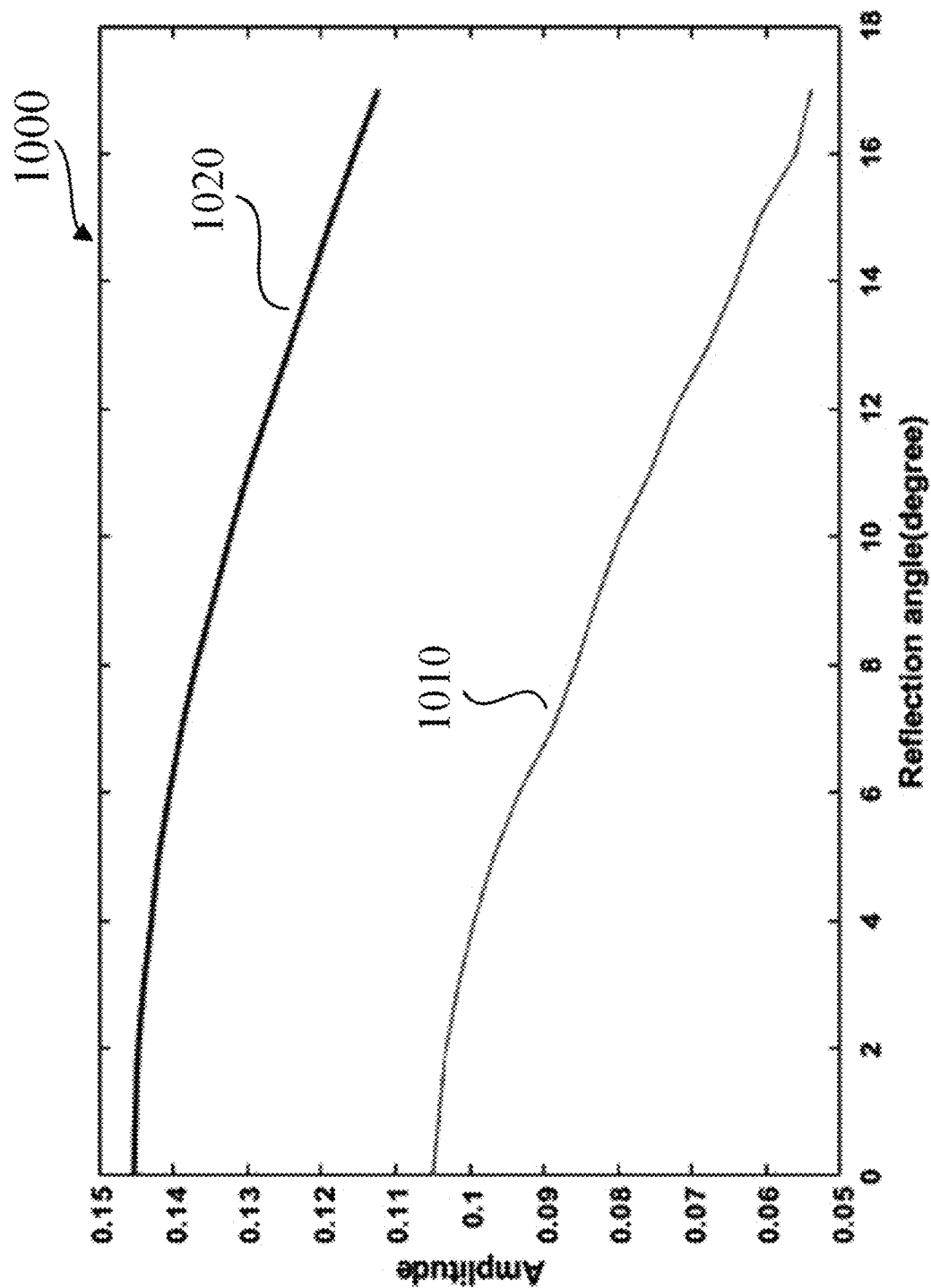
FIG. 10 is a graph illustrating a comparison of a picked AVA curve for reflection around 0.29 seconds between the conventional full-wavefield angle gather in FIG. 7C and the full-wavefield angle gather according to an embodiment in FIG. 7D.

FIG. 10 is a graph illustrating a comparison of an extracted AVA curve for reflections around 0.29 seconds between the conventional full-wavefield angle gather in FIG. 7C and the full-wavefield angle gather according to an embodiment in FIG. 7D. The extracted AVA curve of the conventional full-wavefield angle gather is denoted by reference numeral 1010. The extracted AVA curve of the full-wavefield angle gather according to an embodiment is denoted by reference numeral 1020. The extracted AVA corresponding to an embodiment of the present invention is much clearer than the extracted AVA curve of the conventional method, which is distorted due to the artifacts (noise). The extracted AVA curve for the full-wavefield angle gather according to an embodiment is smoother than the extracted AVA curve for the conventional full-wavefield angle gather, which leads to a superior high-contrast inter thin-bed models due to less noise (less artifacts).

Figure 11:
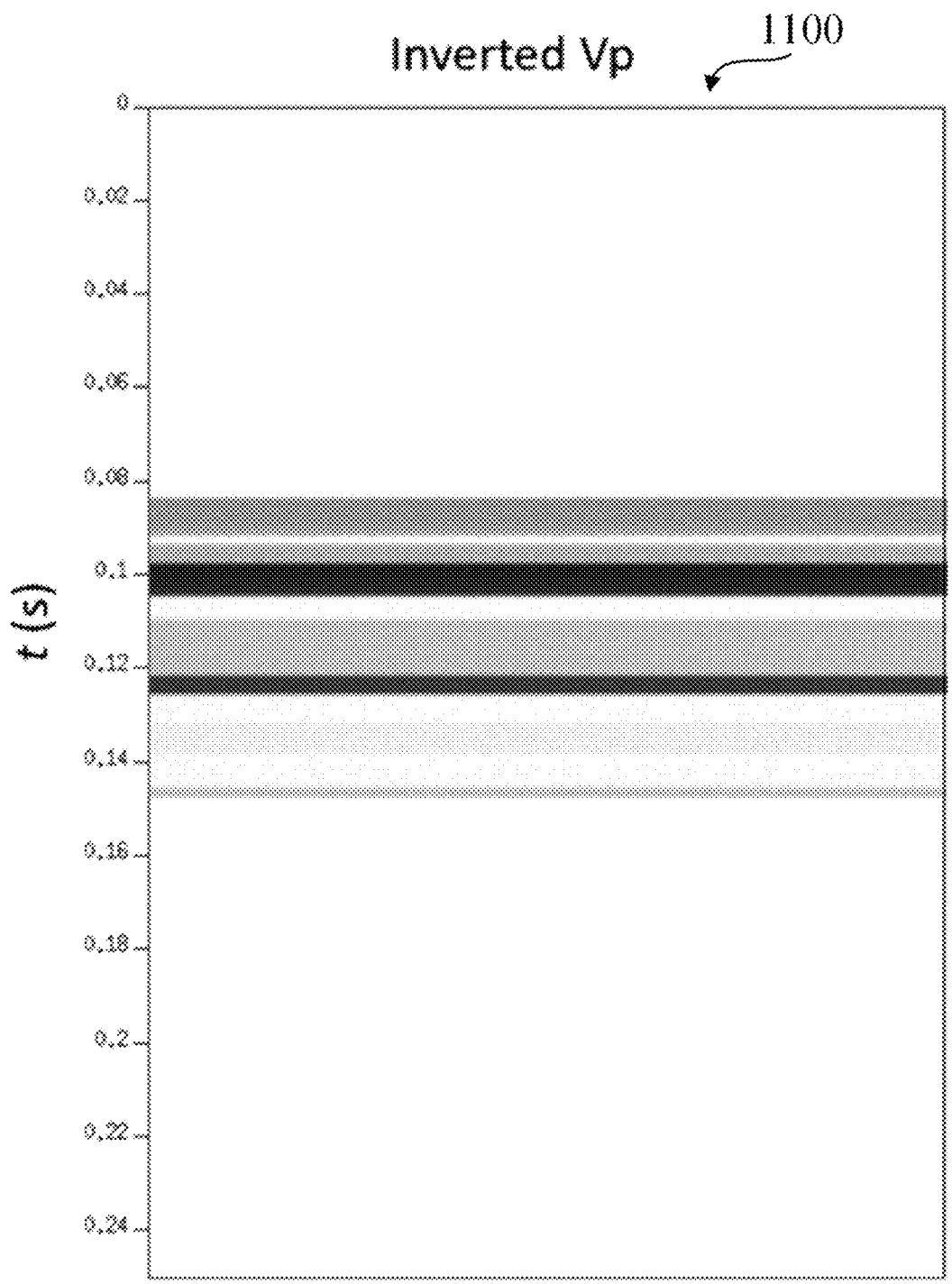
FIG. 11 is a graph illustrating high-contrast inter thin-bed models based on the full-wavefield angle gather.

FIG. 11 is a graph 1100 illustrating high-contrast inter thin-bed models based on the full-wavefield angle gather, which is used to identify locations of oil and/or gas to guide oil drilling. The graph illustrates the full wavefield data generated in the proposed modeling method is captured by inversion and shows multiple and converted waves footprints in inverted parameters, which helps geologist to identify effects from multiples and converted waves. The graph 1100 may be displayed on a display of a computing device such as the personal computer system 325 in FIG. 3. Although FIG. 11 shows a single trace/well, multiple traces/wells may be displayed graphically.

While embodiments of this disclosure have been shown and described, modifications can be made by one skilled in the art without departing from the spirit or teaching of this invention. The embodiments described herein are exemplary only and are not limiting. Many variations and modifications of methods, systems and apparatuses are possible and are within the scope of the invention. Accordingly, the scope of protection is not limited to the embodiments described herein, but is only limited by the claims. The scope of the claims shall include all equivalents of the subject matter of the claims.

What is claimed is:

1. A method for generating a full-wavefield angle gather in high-contrast inter thin-bed models for reservoir characterizations of a survey region, the method comprising:

positioning a well logging tool including one or more sonic generators and one or more well log data recording sensors in a wellbore;

generating sound waves, using the one or more sonic generators, to generate reflections in the survey region;

receiving well log data based on the reflections using the one or more well log data recording sensors, transmitting the well log data to at least one memory, and storing the well log data in the at least one memory;

generating, by a computer system, a full-wavefield angle gather;

generating, by the computer system, the high-contrast inter thin-bed models based on the full-wavefield angle gather; and displaying one or more images of the high-contrast inter thin-bed models based on the full-wavefield angle gather, wherein generating, by the computer system, the full-wavefield angle gather further comprises:

generating a full-wavefield tau-p gather using Kennett modeling;

generating tau-p gather without one or more multiples and/or without one or more Primary-Secondary-Primary (PSP) converted waves; and generating tau-p gather with only one or more multiples and/or one or more PSP converted waves by subtracting the tau-p gather without one or more multiples and/or without one or more PSP converted waves from the full-wavefield tau-p gather.

2. The method of claim 1, wherein generating, by the computer system, the full-wavefield angle gather further comprises calculating a primary-only angle gather.

3. The method of claim 2, wherein a Zoeppritz-based raytracing algorithm is used to calculate the primary-only angle gather.

4. The method of claim 1, wherein generating, by the computer system, the full-wavefield angle gather further comprises converting the tau-p gather with only one or more multiples and/or one or more PSP converted waves into a migrated ray parameter gather by applying an elliptical moveout correction.

5. The method of claim 4, wherein generating, by the computer system, the full-wavefield angle gather further comprises generating an angle gather with only one or more multiples and/or one or more PSP converted waves by converting the migrated ray parameter gather into the angle gather using slowness-to-angle mapping.

6. The method of claim 5, wherein generating, by the computer system, the full-wavefield angle gather further comprises calculating primary-only angle gather using a Zoeppritz-based raytracing algorithm.

7. The method of claim 6, wherein generating, by the computer system, the full-wavefield angle gather further comprises generating the full-wavefield angle gather by adding the Zoeppritz-based raytracing-based primary-only angle gather with the angle gather with only one or more multiples and/or one or more PSP converted waves.

8. The method of claim 1, wherein generating, by the computer system, the full-wavefield angle gather, further comprises:

generating a full-wavefield tau-p gather using Kennett modeling;

generating the tau-p gather without one or more multiples; and generating the tau-p gather with only one or more multiples by subtracting the tau-p gather without one or more multiples from the full-wavefield tau-p gather.

9. The method of claim 1, wherein generating, by the computer system, the full-wavefield angle gather, further comprises:

generating a full-wavefield tau-p gather using Kennett modeling;

generating the tau-p gather without one or more PSP converted waves; and generating the tau-p gather with only one or more multiples by subtracting the tau-p gather without one or more PSP converted waves from the full-wavefield tau-p gather.

10. An apparatus for generating a full-wavefield angle gather in high-contrast inter thin-bed models for reservoir characterizations of a survey region, the apparatus comprising:

a well logging tool comprising one or more sonic generators configured to generate sound waves to generate reflections in the survey region and one or more well log data recording sensors configured to receive well log data based on the reflections, and well logging tool being configured to transmit the well log data;

at least one memory storing the transmitted well log data, the at least one memory comprising instructions; and at least one processor to execute the instructions stored in the at least one memory to implement:

generating a full-wavefield angle gather;

generating the high-contrast inter thin-bed models based on the full-wavefield angle gather; and displaying one or more images of the high-contrast inter thin-bed models based on the full-wavefield angle gather;

wherein generating, by the computer system, the full-wavefield angle gather further comprises:

generating a full-wavefield tau-p gather using Kennett modeling;

generating tau-p gather without one or more multiples and/or without one or more Primary-Secondary-Primary (PSP) converted waves; and generating tau-p gather with only one or more multiples and/or one or more PSP converted waves by subtracting the tau-p gather without one or more multiples and/or without one or more PSP converted waves from the full-wavefield tau-p gather.

11. The apparatus of claim 10, wherein generating the full-wavefield angle gather further comprises calculating primary-only angle gather.

12. The apparatus of claim 11, wherein a Zoeppritz-based raytracing algorithm is used to calculate the primary-only angle gather.

13. The apparatus of claim 10, wherein generating the full-wavefield angle gather further comprise converting the tau-p gather with only one or more multiples and/or one or more PSP converted waves into a migrated ray parameter gather by applying an elliptical moveout correction.

14. The apparatus of claim 13, wherein generating the full-wavefield angle gather further comprises generating an angle gather with only one or more multiples and/or one or more PSP converted waves by converting the migrated ray parameter gather into the angle gather using slowness-to-angle mapping.

15. The apparatus of claim 14, wherein generating the full-wavefield angle gather further comprises calculating primary-only angle gather using a Zoeppritz-based raytracing algorithm.

16. The apparatus of claim 15, wherein generating the full-wavefield angle gather further comprises generating the full-wavefield angle gather by adding the Zoeppritz-based raytracing-based primary-only angle gather with the angle gather with only one or more multiples and one or more PSP converted waves.

17. The apparatus of claim 10, wherein generating the full-wavefield angle gather further comprises:

generating a full-wavefield tau-p gather using Kennett modeling;

generating the tau-p gather without one or more multiples; and generating the tau-p gather with only one or more multiples by subtracting the tau-p gather without one or more multiples from the full-wavefield tau-p gather.

18. The apparatus of claim 10, wherein generating the full-wavefield angle gather further comprises:

generating a full-wavefield tau-p gather using Kennett modeling;

generating the tau-p gather without one or more PSP converted waves; and generating the tau-p gather with only one or more PSP converted waves by subtracting the tau-p gather without one or more PSP converted waves from the full-wavefield tau-p gather.

* * * * *